Oct. 21, 1969 P. R. BROWN 3,473,505
MOORING DEVICE
Original Filed Oct. 17, 1966 4 Sheets-Sheet 1
FIG. 1
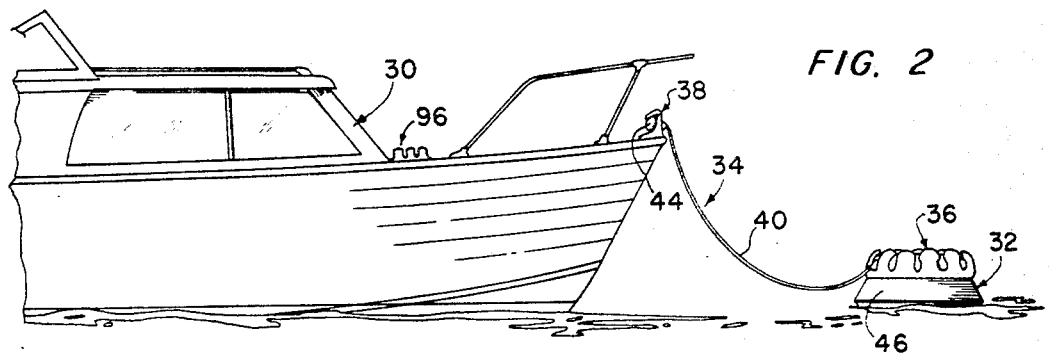
FIG. 2
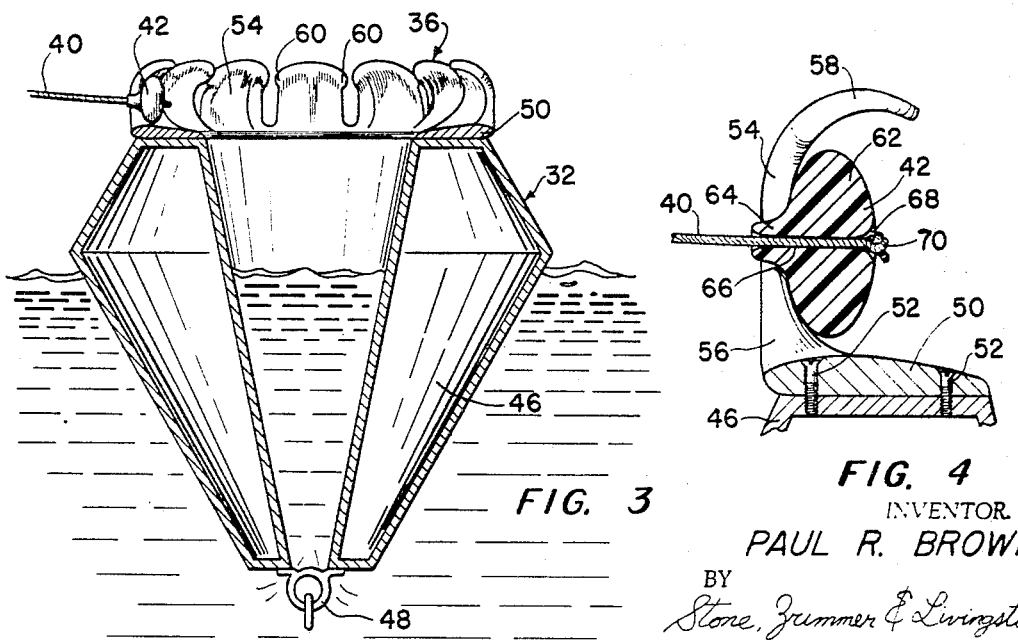
FIG. 3
FIG. 4
INVENTOR.
PAUL R. BROWN
BY
Stone, Zummer & Livingston
Attorneys Oct. 21, 1969     P. R. BROWN     3,473,505
MOORING DEVICE
Original Filed Oct. 17, 1966     4 Sheets-Sheet 1
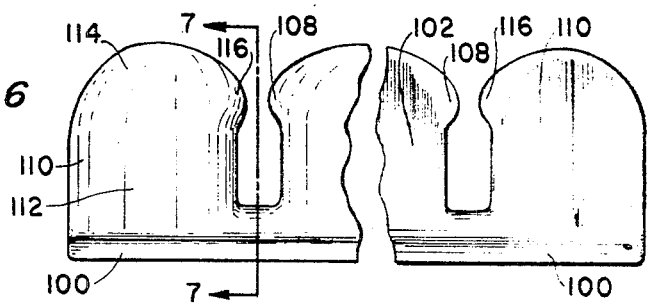
FIG. 6
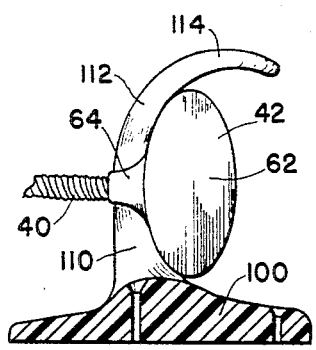
FIG. 7
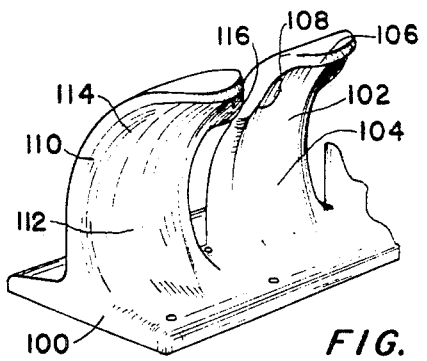
FIG. 8
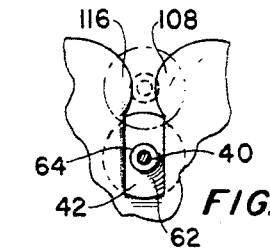
FIG. 9
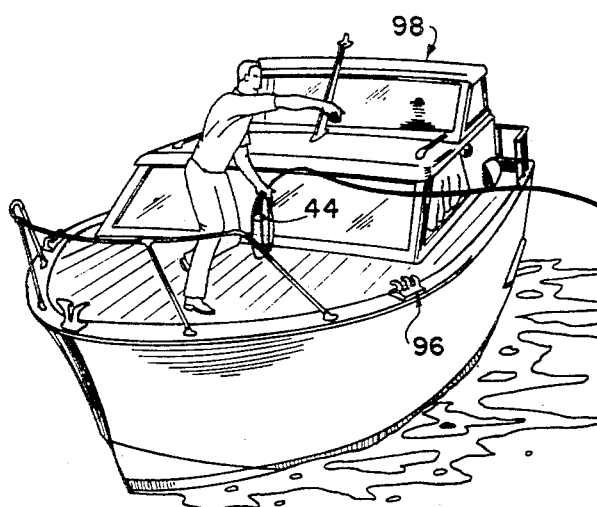
FIG. 5
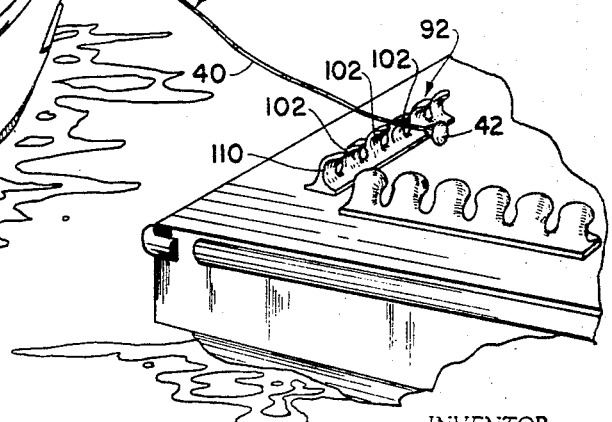
INVENTOR.
PAUL R. BROWN
BY
*Stone, Zummer & Livingston*
Attorneys Oct. 21, 1969   P. R. BROWN   3,473,505
MOORING DEVICE
Original Filed Oct. 17, 1966   4 Sheets-Sheet 3
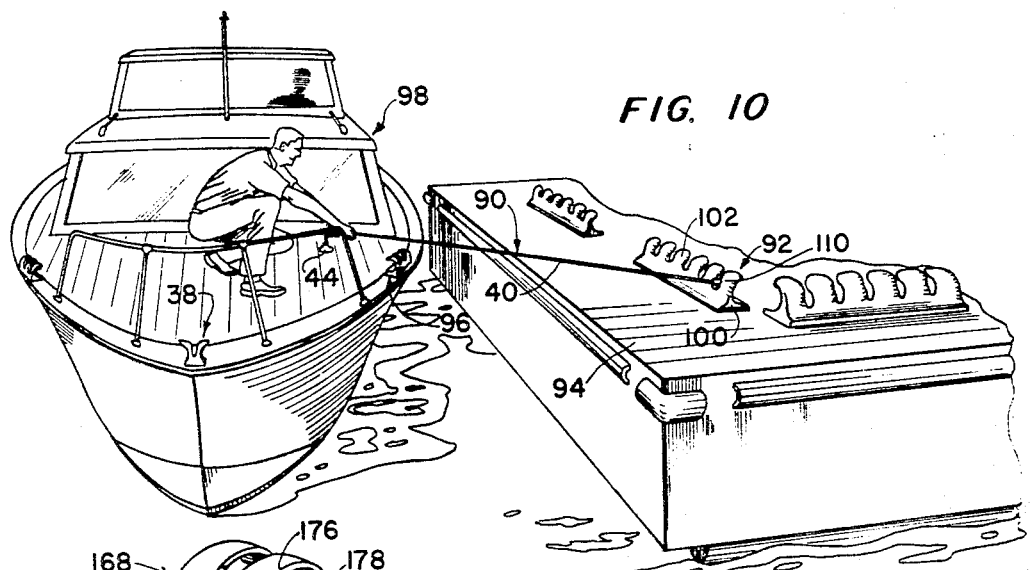
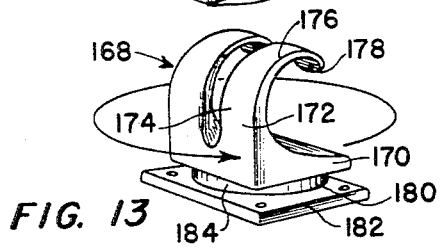
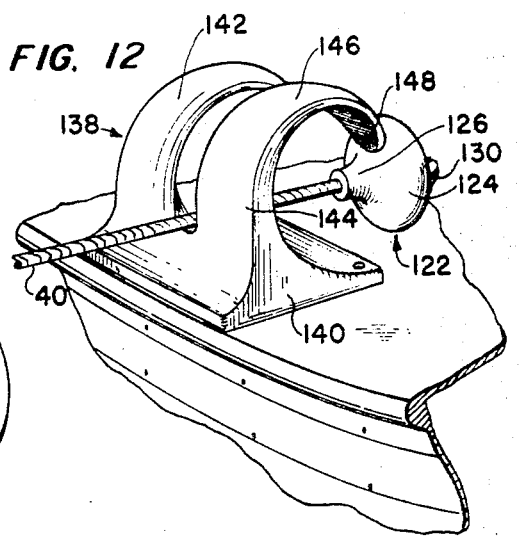
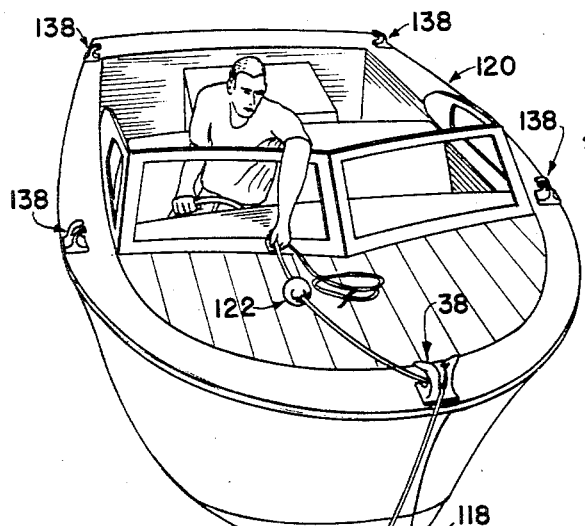
INVENTOR.
PAUL R. BROWN
BY
Stone, Zummer & Livingston
Attorneys Oct. 21, 1969　　　　　P. R. BROWN　　　　　3,473,505
MOORING DEVICE
Original Filed Oct. 17, 1966　　　　　4 Sheets-Sheet 4
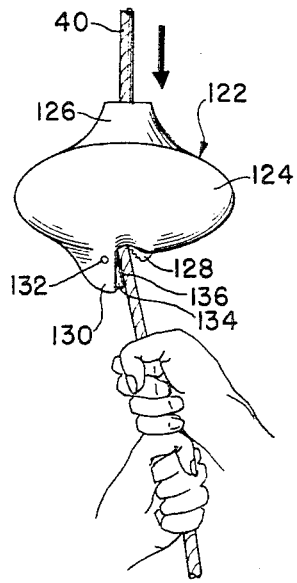
FIG. 14
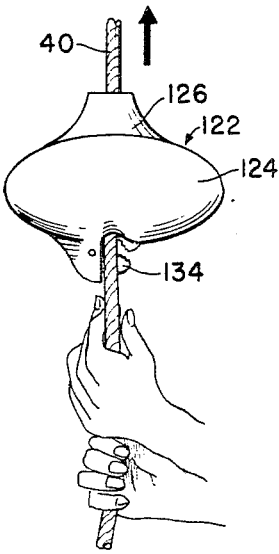
FIG. 15
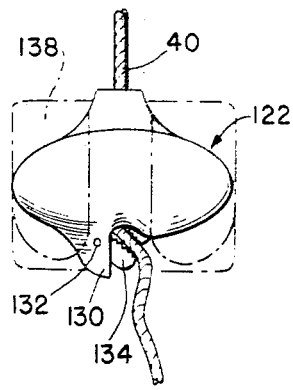
FIG. 16
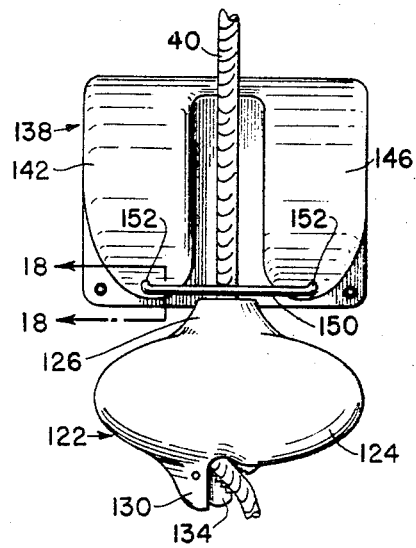
FIG. 17
FIG. 18
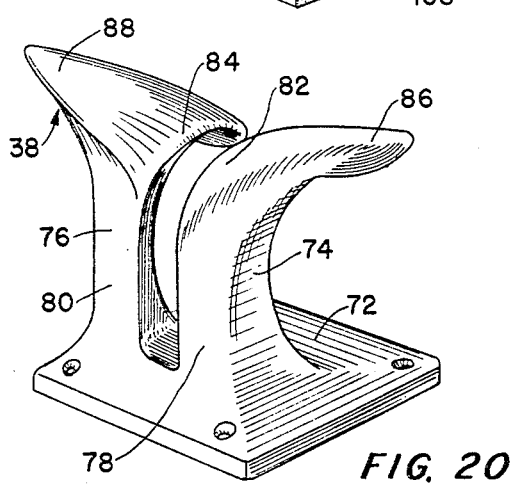
FIG. 19
FIG. 20
INVENTOR.
PAUL R. BROWN
BY
Stone, Zummer & Livingston
Attorneys United States Patent Office 3,473,505
Patented Oct. 21, 1969

3,473,505
MOORING DEVICE
Paul R. Brown, Barrington, Ill., assignor to Seal Basin Marine Company, Chicago, Ill., a corporation of Illinois
Continuation of application Ser. No. 587,224, Oct. 17, 1966. This application July 29, 1968, Ser. No. 751,682
Int. Cl. B63b *21/00;* F16g *11/00*
U.S. Cl. 114—230                                    19 Claims

ABSTRACT OF THE DISCLOSURE

A mooring device having a base, a pair of ears formed integral with the base and extending upward from said base, each of said ears including an arm formed integral with the base and a generally U-shaped upper portion having one arm of the U formed integral with said arm and the other arm of the U extending toward the base.

CROSS-REFERENCE TO RELATED APPLICATION

This application is a continuation of applicant's copending application Ser. No. 587,224, filed Oct. 17, 1966, entitled "Mooring Device," now abandoned.

This invention relates to a mooring device and, more particularly, to a mooring device which simplifies the mooring of a water-craft to a relatively fixed object, such as, a pier or a buoy.

One of the problems encountered in the operation of a water-craft involves the secure connection of the water-craft to a buoy or a pier with relative facility. In the operation of large vessels, substantial difficulty is encountered in attaching a line from the vessel to a buoy because seamen must be placed on the buoy in order to secure a line. In the operation of small craft, especially pleasure craft, the operator of such a craft encounters difficulty in securing his craft to a buoy or a pier because he ordinarily lacks sufficiently experienced crewmen to secure a line to the buoy or the pier. It is, therefore, one of the principal objects of this invention to provide an improved construction for a mooring device which allows a water-craft to be quickly and easily secured to a relatively fixed object, such as, a pier or a buoy.

It is another object of the instant invention to provide novel construction of a chock cleat which may be easily mounted on a pier, buoy, or water-craft for securing a line to the pier, buoy, or water-craft.

It is another object of the herein disclosed invention to provide an improved construction for a holding means for use in a mooring device, which holding means is adapted for readily gripping a line.

It is still another object of this invention to provide a mooring device which may be economically manufactured and easily installed.

Other objects and uses of the instant invention will become readily apparent to those skilled in the art upon a perusal of the following specification in light of the accompanying drawings in which:

FIGURE 1 is a perspective view of a portion of a water-craft and a buoy having a mooring device embodying the instant invention mounted thereon showing how a line may be readily positioned to secure the water-craft to the buoy;

FIGURE 2 is a side-elevational view of the water-craft and buoy shown in FIGURE 1, but showing the line connected to both the water-craft and the buoy;

FIGURE 3 is a cross-sectional view of the buoy shown in FIGURES 1 and 2 showing a chock cleat mounted on the buoy with a line secured to the chock cleat;

FIGURE 4 is an enlarged fragmentary cross-sectional view showing the details of construction of a portion of the chock cleat shown in FIGURE 3, showing the method of securing the line to the chock cleat;

FIGURE 5 is a perspective view of a water-craft and a fragmentary portion of a pier, with a portion of the subject mooring device mounted on the pier, showing a line being heaved toward the pier for engagement of the line with a chock cleat on the pier;

FIGURE 6 is a front-and-rear view of fragmentary portions of the chock cleat shown in FIGURE 5;

FIGURE 7 is a cross-sectional view of the chock cleat shown in FIGURE 6, but showing a line holder mounted into engagement with the chock cleat;

FIGURE 8 is a perspective view of a fragmentary portion of the chock cleat shown in FIGURES 5, 6, and 7;

FIGURE 9 is an enlarged fragmentary view of a portion of the chock cleat shown in FIGURE 6, but showing a holder positioned in engagement with the chock cleat and the holder also shown in phantom view in an attitude for engagement or disengagement of the holder with the chock cleat;

FIGURE 10 is a perspective view of the pier and water-craft shown in FIGURE 5, but showing the line connected to the chock cleat and showing how the water-craft may be pulled into the pier;

FIGURE 11 is a perspective view of a water-craft and a portion of a pier, showing a mooring device embodying the instant invention mounted on the pier and the water-craft to show how the water-craft is connected to the pier;

FIGURE 12 is a perspective view of a chock cleat embodying the instant invention, showing a line positioned in an attitude for connection with the chock cleat;

FIGURE 13 is a perspective view of a chock cleat embodying the instant invention in which one portion of the chock cleat is rotatable relative to a fixed portion of the chock cleat;

FIGURE 14 is a plan view showing a movable holder in engagement with a line;

FIGURE 15 is a plan view of the holder shown in FIGURE 14, but showing the holder in an attitude to allow the line to pass through the holder;

FIGURE 16 is a plan view of the holder shown in FIGURES 14 and 15 showing a line in a locked attitude relative to the holder and showing a chock cleat in phantom view in engagement with the holder;

FIGURE 17 is a plan view of the holder shown in FIGURES 14, 15, and 16 in an attitude for engagement with a chock cleat and the chock cleat having a line lock mounted thereon;

FIGURE 18 is a cross-sectional view taken on line 18—18 of FIGURE 17 showing a portion of the line lock and a portion of the chock cleat being shown in phantom view;

FIGURE 19 is a perspective view of a chock cleat embodying the subject invention and being adapted to receive a line lock; and FIGURE 20 is an enlarged perspective view of a chock cleat embodying the instant invention, which chock cleat is shown in FIGURES 1, 2, 5, 10, and 11.

Referring now to the drawings, and especially to FIGURE 1, a conventional water-craft generally indicated by numeral 30 is shown therein, with a conventional buoy 32 positioned adjacent to the water-craft and a mooring device 34 shown attached to the water-craft and the buoy 32. The mooring device 34 generally includes a crown chock cleat 36 mounted on the upper portion of the buoy, a wing chock cleat 38 mounted on the peak of the water-craft 30, a conventional line 40, a holder 42 connected to one end of the line and adapted for engagement with the crown chock cleat 36, and a second holder 44 connected to the other end of the line and shown in engagement with the wing chock cleat 38.

Referring now to FIGURES 3 and 4, wherein the details of construction of the buoy and the crown chock cleat are more clearly shown, it may be seen that the buoy 32 is conventional in its construction in that it includes a buoy body 46 with an attachment ring 48 connected to the bottom of the buoy and adapted for connection to a line or chain which is fixed to the water bottom, thereby providing a relatively fixed object. Mounted on the upper portion of the buoy body is the crown chock cleat 36.

The crown chock cleat includes a ring-like base 50 which is secured to the top of the buoy by a plurality of conventional screws 52. Formed integral with the base 50 is a plurality of identical ears 54. Each of the ears 54 includes an upwardly extending arm portion 56 which is formed integral with the base 50. Formed integral with the upper portion of the arm 56 is a generally U-shaped upper portion 58, in which one arm of the U is formed integral with the arm portion 56 and the other arm of the U generally extends in a direction toward the base and toward the center of the base 50. Each of the U-shaped upper portions includes a protuberance 60 on each side of the U-shaped upper portion, and each protuberance extends outward toward the adjacent ear so that a constricted passage is defined between the protuberances.

The holder 42 has the line 40 connected to it as mentioned above. The holder 42 includes an enlarged head 62 with a proboscis 64 formed integral therewith. Extending through the head and proboscis is a central line aperture 66, and the head includes a recess 68 formed integral therewith, which recess communicates with the line aperture. The line 40 is positioned in the aperture 66 and has a knot 70 formed in its end, which knot is positioned in the recess 68, so that the line is secured to the holder 42. The holder 44 is identical in construction to the holder 42 and is secured to line 40 in the same manner that holder 42 is secured to the line.

Referring now to FIGURE 20, the details of construction of the wing chock cleat 38 may be seen therein. The wing chock cleat includes a rectangular base 72, which has a pair of ears 74 and 76 formed integral therewith. The ears 74 and 76 include respective upstanding arm portions 78 and 80 formed integral with the base 72. Formed integral with the upper portions of the arm portions 78 and 80 are generally U-shaped upper portions 82 and 84, respectively. The U-shaped upper portions each include an arm which is formed integral with the respective arm portion and the free arm generally extends downward toward the base 72. Outwardly extending wings 86 and 88 are formed integral with U-shaped upper portions 82 and 84, respectively. The wings 86 and 88 cooperate with their U-shaped upper portions 82 and 84, respectively, to provide a guiding surface for the wing chock cleat 38 to guide the line to the position between the ears and thereby facilitate the engagement of the line with the chock cleat.

The operation of the mooring device is simple in that in order to secure the water-craft 30 to buoy 32 the crewman need only place the line 40 between ears 74 and 80 of the wing chock cleat 38 and place the head of the holder into engagement with the arms 78 and 80, thereby securing one end of the line to the wing chock cleat. The crewman then need only heave or drop the holder 42 with the other end of the line in the central portion of the crown chock cleat 36. The line 40 then naturally falls between a pair of ears 54. The line is free to pass through the constricted passage between the protuberances 60 of adjacent ears. And as the water-craft floats away from the buoy, the holder 42 is pulled into engagement with the chock cleat. The holder head 62 engages the arm portions 56 of the ears, thereby securing the line to the buoy. It may be appreciated that in spite of chop or rough weather, the holder is prevented from coming out of engagement with the crown chock cleat because the upper portion of the ears is generally U-shaped; thereby holding the holder in position. Also, the holder may not slide out from between the ears inasmuch as the proboscis of the holder engages the protuberances of the ears so that the proboscis is retained between the base and the protuberances.

It is apparent that the instant mooring device may be readily disengaged by simply moving the craft toward the buoy and then lifting the line out from between the ears and lifting the holder device out from the central portion of the crown chock cleat. The line and holder are then hauled into the water-craft.

Referring now to FIGURES 5 and 10, a second form of a mooring device, generally indicated by numeral 90 and embodying the subject invention, is shown therein. The mooring device 90 utilizes line 40 and holder 42 and second holder 44 described in detail above. However, a linear chock cleat 92 is mounted on a pier 94 which is engageable with holder 42 and a linear chock cleat 96 is mounted on a water-craft 98 for engagement with the second holder 44.

The linear chock cleat 92 includes an elongated base 100 with a plurality of ears 102 formed integral with base 100. Each of the ears 102 includes an arm portion 104 with a generally U-shaped upper portion 106 having one arm of the U formed integral with the arm 104 and the other arm of the U extending generally downward toward the base 100. Each of the ears 102 has a pair of protuberances 108 formed integral therewith, which protuberances 108 each extend toward an adjacent ear to define a constricted passage between the ears.

The chock cleat 92 also includes end ears 110 which are similar in construction to the ears 102 and are formed integral with base 100. The end ears each have an arm portion 112 with a U-shaped upper portion 114, similar to upper portion 106. However, the end ears 110 have only a single protuberance 116, which is similar to protuberance 108 mentioned above. The protuberances 116 extend toward the adjacent protuberances 108, as may be best seen in FIGURE 6, to form a constricted passage.

The linear chock cleat 96, which is mounted on the water-craft 98, is similar in construction to the linear chock cleat 92. But, the chock cleat 96 has a fewer number of ears. However, the construction of the ears is identical to that of chock cleat 92.

As was mentioned above, the chock cleats 92 and 96 are secured to the pier and the water-craft, respectively. In order to accomplish mooring of the water-craft to the pier, a crewman on the water-craft 98 heaves the line 40 with holder 42 toward the pier so that a portion of the line falls between a pair of the ears of the chock cleat and passes between a pair of protuberances on the ears. The line is then pulled in toward the water-craft so that the holder 42 engages a pair of ears of the chock cleat 92 as shown in FIGURE 7, thereby securing the line to the linear chock cleat. As may be clearly seen in FIGURE 9, the line may pass between the protuberances 116 and 108. However, the proboscis 64 of the holder 42 may not pass between the protuberances so that the holder may not readily become disengaged from the chock cleat. The other end of the line 40 is then secured to the chock cleat 96 on the water-craft by placing the holder 44 in engagement with chock cleat 96 in the same manner that holder 42 engages chock cleat 92.

It may be readily appreciated that the instant device may be quickly and efficiently disengaged from the linear chock cleat 92 by simply relieving the tension on the line 40, pulling the holder 42 away from the chock cleat 92 and then lifting the line 40 out from between the protuberances. From the foregoing, it is apparent that the subject mooring device may be readily engaged and disengaged in the course of the operation of a water-craft.

Referring now to FIGURES 11, 14, 15 and 16, a third form of the subject invention is shown in an embodiment of a mooring device, generally indicated by numeral 118. The mooring device 118 utilizes the linear chock cleat 92 with the line 40 having holder 42 connected to one end of the line, the wing chock cleat 38 mounted on a water-craft 120, and a movable holder 122 connected to the line 40. The construction of the movable holder 122 may be best seen in FIGURES 14, 15 and 16. The movable holder 122 includes a head 124 and a proboscis 126 formed integral with the head. The proboscis 126 and head 124 contain a line aperture through their centers, as does head 42. Formed integral with the head, adjacent to the line aperture on the side, spaced away from the proboscis 126, is a serrated surface 128. A snout 130 is formed integral with the head, which snout is spaced from the serrated surface 128. A pin 132 is mounted in the snout, and a dog 134 is mounted on the pin 132 and is pivoted relative to the snout 130. The dog 134 includes a serrated surface 136.

The operation of the mooring device 118 is similar to the mooring devices 90 and 34 in that the holder 42 is placed into engagement with the linear chock cleat 92. The line 40 is then pulled to bring the water-craft 120 to an appropriate distance from the pier 94. The movable holder 122 is then moved along the line 40 to an appropriate position. It is apparent that the holder 122 may be moved relative to the line by placing a portion of the line above the dog 134. The line is positioned between the ears of the wing chock cleat 38 and the line is then placed between the serrated surface of the dog and the serrated surface 128 to hold the line in one direction; that is, to prevent the line from moving outward from the holder, as may be seen in FIGURES 16 and 17. The holder is then placed in engagement with the wing chock cleat 38 to secure the water-craft to the pier.

In order to release the movable holder, it is necessary only to pull the free end of the line to pivot the dog and lift the line above the dog so that the holder is free to move relative to the line. It is apparent that the line may be disengaged from the linear chock cleat 92 in the same manner as described above to facilitate engagement and disengagement of the subject mooring device.

Referring now to FIGURES 12, 17 and 18, a modified form of the linear chock cleat is shown therein, which modified form is generally indicated by numeral 138. The chock cleat 138 includes a generally flat base 140 with a pair of ears 142 formed integral therewith. Each of the ears 142 includes an upstanding arm 144 with a generally U-shaped upper portion 146 formed integral with the arm. The upper portions each having an inclined guiding surface sloping toward the space therebetween to provide a guiding surface to direct a line toward said space. It should be noted that in the construction of the instant chock cleat the ears do not contain any protuberance but rather a rope lock is provided for engagement with the ears.

A rope lock is mounted between the ears to provide a means to prevent the line from being pulled up from between the ears. Each of the ears contains a lock aperture 148, and a lock bar 150 is mounted in each of the apertures 148. The lock bar 150 has formed on each end a finger 152 which is substantially perpendicular to the main portion of the bar, and a catch 154 is formed integral with each of the fingers 152. The lock bar is positioned in the apertures 148 by placing the catch in the apertures and then rotating the lock bar so that the fingers 152 enter the apertures to hold the lock bar in place.

It may be appreciated that after the line 40 is placed in position between the ears 142, the lock bar 150 is placed in the appropriate apertures so that the line 40 may not be lifted out of the chock cleat 138. The chock cleat 138 may be mounted on the water-craft, as shown in FIGURE 11, and of course it may be mounted on a pier, such as, pier 94.

When the chock cleat 138 is mounted on a pier, such as, pier 94, it is desirable to provide a plurality of ears to provide a chock cleat, such as, that generally indicated by numeral 156 in FIGURE 19. The chock cleat shown in FIGURE 19 includes a flat base 158 with a plurality of ears 160. Each of the ears includes an arm 162 with a generally U-shaped upper portion 164, which U-shaped portion is formed integral with the respective arm. As may be seen in FIGURE 19, each of the ears includes a lock aperture 166 to receive a lock bar.

Referring now to FIGURE 13, a modified form of the chock cleat 138 is shown therein, and this modified form is generally indicated by numeral 168. The chock cleat 168 includes a base 170 and a pair of ears 172. Each of the ears includes an arm 174 with a U-shaped curved upper portion 176, formed integral with the respective arm. The other arm of the U-shaped upper portion extends generally downward toward the base 170. Each of the arms includes a lock aperture 178. The base 170 is rotatably supported on a mount 180. The mount 180 includes a plate 182 which is adapted to be secured to a surface, such as, a deck of a water-craft. The plate 182 includes a boss 184 which has mounted therein an axle which is not shown therein. The axle is connected to the base 170 so that the base may rotate 360° relative to the plate 182. The chock cleat 168 receives a line in the same manner that chock cleat 138 does, as was described in detail above.

The particular advantage of chock cleat 138 is that the chock cleat may be rotated so that the line is always perpendicular to the ears 172. Obviously, the chock cleat 168 may be utilized in any of the previous-mentioned mooring devices.

Although specific constructions of mooring devices have been shown and disclosed in detail above, it is readily apparent that chock cleats and holders may be substituted as may be desired by those skilled in the art in order to facilitate the operation of the mooring device for a particular set of conditions. It is to be expressly understood that though those skilled in the art may make various modifications and changes in the specific construction of each of the devices which constitute a portion of the subject invention.

What is claimed is:

1. A mooring device for securing a water-craft to a relatively fixed object comprising, in combination, a base secured to the relatively fixed object, a pair of relatively flat ears formed integral with the base and extending upward from the relatively fixed object, a line positioned between the ears, holding means connected to the line and engageable with the ears to hold the line between the ears, a second base secured to the water-craft, a second pair of relatively flat ears formed integral with the second base and extending upward from the water-craft with a portion of the line positioned between the second pair of ears, and second holding means secured to the line and engaging the second pair of ears to hold the line between the second pair of ears, whereby the water-craft is secured to the relatively fixed object by means of said line and the water-craft may be disengaged by removing the line from between either of said pairs of ears.

2. A mooring device as described in claim 1, wherein the first-mentioned base defines a circle and the ears formed integral with the base extend generally toward the middle of the circle defined by the base.

3. A mooring device as described in claim 2 wherein the first-mentioned holding means includes an enlarged head engageable with the line and engageable with the ears for holding the line between the ears, and a proboscis formed integral with the head and engageable with the ears.

4. A mooring device as described in claim 1 wherein the first-mentioned holding means includes an enlarged head engageable with the line and engageable with the ears for holding the line between the ears, and a proboscis formed integral with the head and engageable with the ears.

5. A mooring device as described in claim 4 wherein the second holding means includes a head having a line aperture for receiving the line, and a dog movably mounted on said head and engageable with the line passing through the aperture to hold the line in one direction.

6. A mooring device as described in claim 1 wherein an outwardly extending wing is formed integral with the upper portion of each of the ears of the first-mentioned pair of ears to provide a guiding surface.

7. A mooring device as described in claim 1 wherein a plurality of ears are formed integral with the first-mentioned base and the line is positionable between any pair of adjacent ears.

8. A mooring device as described in claim 1 wherein each of the ears includes an arm formed integral with the base and a U-shaped upper portion having one arm of the U formed integral with the arm and the other arm of the U extending toward the base, whereby the U-shaped upper portion is engageable with the holding means.

9. A mooring device as described in claim 1 wherein each ear includes a protuberance positioned adjacent to the upper portion of the ear and extending toward the adjacent ear to provide a constricted passage for the line.

10. A mooring device as described in claim 1 wherein each of the ears of each pair of ears includes an arm formed integral with the respective base, and a generally U-shaped upper portion having one arm of the U formed integral with said arm and the other arm of the U extending toward the respective base; and the second holding means includes a head having an aperture for receiving a line, and a dog movably mounted on said head and engageable with the line passing through the aperture to hold the line in one direction.

11. A chock cleat for use in securing a water-craft comprising, a base, a pair of spaced arms formed integral with the base and extending outwardly therefrom, an upper portion formed integral with each of the arms, each of the arms and upper portion cooperating with said base to define a U-shape, said arms and upper portions having generally open sides, each of said arms and respective upper portions being spaced from the other of said arms and respective upper portions for receiving a line therebetween, and each of said upper portions having an inclined guiding surface sloping toward the space between the arms and providing a guiding surface to direct a line toward said space.

12. A chock cleat as defined in claim 11 including a wing formed integral with each upper portion and extending outwardly from the space between the arms and the respective upper portions to provide an extension of the guiding surface.

13. A chock cleat as defined in claim 11 including a line lock removably mounted on the upper portion of each of the arms for retaining a line between the arms.

14. A chock cleat as defined in claim 13 wherein each curved upper portion includes a lock aperture, the line lock includes a line lock bar, a finger formed integral with each end of the line lock bar, and a catch formed integral with each of the fingers, wherein the fingers are removably mounted in a lock aperture to hold the lock bar between the arms to prevent a line from being lifted out of the chock cleat.

15. A chock cleat as described in claim 11 including a plurality of arms wherein each of the arms is spaced from an adjacent arm to receive a line between adjacent arms.

16. A chock cleat as defined in claim 11 including a mount rotatably connected to the base, whereby the base is free to swivel about the mount.

17. A chock cleat as described in claim 11 wherein the base defines a circle and a plurality of arms are formed integral with the base and the upper portions are curved and extend generally toward the middle of the circle defined by the base.

18. A chock cleat as defined in claim 11 wherein a wing is formed integral with the upper portion of each of the arms and extends outwardly from the space between the arms to provide an extension of the guiding surface.

19. A chock cleat as defined in claim 11 wherein each of the upper portions includes a protuberance formed integral therewith and is positioned adjacent to the other upper portion to define a constricted passage therebetween.

References Cited

UNITED STATES PATENTS

| | | | |
|---|---|---|---|
| 442,176 | 12/1890 | Frost | 24—114 |
| 1,520,716 | 12/1924 | Judd | 114—218 |
| 3,110,046 | 11/1963 | Fischer | 114—230 X |
| 3,280,784 | 10/1966 | Stambrook | 114—230 |
| 3,293,711 | 12/1966 | Emery | 24—123 |
| 76,706 | 4/1868 | Brevoort | 287—89 |

TRYGVE M. BLIX, Primary Examiner

U.S. Cl. X.R.
24—123; 114—218